United States Patent [19]

Goebel et al.

[11] 4,347,293

[45] Aug. 31, 1982

[54] ELECTROCHEMICAL CELL

[75] Inventors: Franz Goebel, Sudbury; Cyril Morgan, Manchester, both of Mass.

[73] Assignee: GTE Products Corporation, Stamford, Conn.

[21] Appl. No.: 145,181

[22] Filed: Apr. 29, 1980

[51] Int. Cl.³ .............................................. H01M 6/02
[52] U.S. Cl. .................................... 429/105; 429/128; 429/167
[58] Field of Search ................ 429/128, 218, 94, 167, 429/168, 169, 196, 161, 105

[56] References Cited

U.S. PATENT DOCUMENTS

| | | | |
|---|---|---|---|
| 1,644,017 | 10/1927 | Hendry | 429/128 |
| 3,069,485 | 12/1962 | Winger et al. | 429/218 |
| 3,116,172 | 12/1963 | Wilke et al. | 429/128 |
| 4,060,668 | 11/1977 | Goebel | 429/218 |
| 4,154,906 | 5/1979 | Bubnick et al. | 429/128 |

*Primary Examiner*—Donald L. Walton
*Attorney, Agent, or Firm*—Peter Xiarhos

[57] ABSTRACT

A primary electrochemical cell having a carbon current collector cathode structure of improved design. The electrochemical cell includes an elongated housing containing an electrolytic solution and a battery stack in contact with the electrolytic solution. The battery stack includes a concentric arrangement of an anode, a porous separator, and a carbon current collector cathode structure. The carbon current collector cathode structure in accordance with the invention includes a vertical stacked array of annular-shaped porous carbon elements having coaxially aligned openings therein. An elongated, hollow, metal current collector tube having a large number of small openings formed therein for its entire length is disposed within and along the openings in the array of carbon elements and in direct physical contact with the carbon elements. The electrolytic solution in the cell is supplied directly to the array of carbon elements and also by way of the openings in the current collector tube. The carbon elements have a network of electrolytic conducting channels therein and respond to the electrolytic solution received thereby to swell or expand outwardly against the porous separator and anode. As a result, constituent particles of the carbon elements fill the openings in the current collector tube, thereby permanently locking the array of carbon elements to the tube.

11 Claims, 3 Drawing Figures

ELECTROCHEMICAL CELL

CROSS-REFERENCE TO RELATED APPLICATIONS

In co-pending patent application Ser. No. 145,177, now patent 4,283,468 filed concurrently herewith in the names of Franz Goebel and Cyril Morgan, and entitled "ELECTROCHEMICAL CELL INSENSITIVE TO PHYSICAL ORIENTATION", there is disclosed and claimed an orientation-insensitive cell incorporating a battery stack including a cathode current electrode structure as disclosed and claimed in the present application.

In co-pending application Ser. No. 145,108, now patent 4,309,817 filed concurrently herewith in the names of Franz Goebel and Ibsen R. Hansen, and entitled "METHOD FOR ASSEMBLING AN ELECTROCHEMICAL CELL", there is disclosed and claimed a method for assembling a battery stack as utilized within an electrochemical cell as disclosed and claimed in the present application.

BACKGROUND OF THE INVENTION

The present invention relates to an electrochemical cell and, more particularly, to a primary electrochemical cell having a carbon cathode structure of improved design.

Primary electrochemical cells are utilized for a wide variety of applications and are commonly available in a large assortment of sizes and shapes. Furthermore, a number of electrochemical systems are known for incorporation into such primary electrochemical cells. Many of these electrochemical cells utilize a carbon cathode structure. By way of example, in U.S. Pat. No. 4,060,668, in the name of Franz Goebel and assigned to GTE Laboratories Incorporated, there is disclosed an electrochemical system including an anode, a carbon current collector cathode structure, and an electrolytic solution in contact with the anode and the carbon current collector cathode structure. The carbon current collector cathode structure employed in this electrochemical system includes a preformed porous cylindrical carbon structure of a specified length (as determined by the size of the cell), and a twisted metal cathode current collector impressed into and along the carbon structure. The porous carbon structure comprises an aggregation of a large number of porous semi-rigid globules which are pressed together in a manner to define a multiplicity of electrolyte channels. By virtue of these channels, the electrolytic solution can diffuse throughout the porous carbon structure and contact the cathodic particles of the structure.

While carbon current collector cathode structures as described hereinabove can be constructed and successfully employed within electrochemical cells, they nonetheless are subject to numerous possible problems and disadvantages. More particularly, the preformed porous carbon structures are inherently fragile and therefore difficult to produce in any reasonable or substantial length (e.g., 2 inches or more) without breaking or falling apart. Further, even when a carbon structure is successfully formed to the desired length, the subsequent act of impressing a metal cathode current collector into the preformed carbon structure, either by twisting or forcing the metal cathode current collector logitudinally into the preformed carbon structure, cannot be controlled with great accuracy. As a result, the mechanical and electrical contact between the twisted metal cathode current collector and the preformed carbon structure may be inadequate to satisfy the stringent requirements and specifications of the electrochemical cell in which such structure is to be used.

BRIEF SUMMARY OF THE INVENTION

In accordance with the present invention, a carbon cathode structure is provided for an electrochemical cell which avoids the problems and disadvantages associated with prior art carbon cathode structures as described hereinabove.

The carbon cathode structure in accordance with the present invention includes a plurality of individual porous carbon elements arranged in a stacked array and each having an opening extending completely therethrough. An elongated, hollow, metal tube having a plurality of openings formed therein along its length is positioned within and along the openings in the stacked array of porous carbon elements and in direct physical contact with the porous carbon elements of the stacked array. When the abovementioned assembly is employed in an electrochemical cell, specifically, as part of the electrochemical system of the cell, the cell further includes an electrode in direct contact with a housing of the cell and a porous separator in direct contact with he electrode. The abovementioned assembly of carbon elements and the hollow metal tube is in direct contact with the porous separator. An electrolytic solution is applied to the abovementioned components of the cell and also received within the hollow metal tube. This electrolytic solution is supplied directly to the porous carbon elements and also by way of the openings formed in the tube. As a result, the carbon elements are permeated by the electrolytic solution and respond to the electrolytic solution by expanding outwardly against the porous separator and the electrode in contact with the housing of the cell. Due to this expansion, the openings in the hollow tube are filled with constituent particles of the carbon elements, thereby permanently locking the array of carbon elements to the hollow tube.

BRIEF DESCRIPTION OF THE DRAWING

Various objects, features and advantages of an electrochemical cell including a carbon cathode structure in accordance with the present invention will be apparent from a detailed discussion taken in conjunction with the accompanying drawing in which.

DETAILED DESCRIPTION OF THE INVENTION

Figure 1:
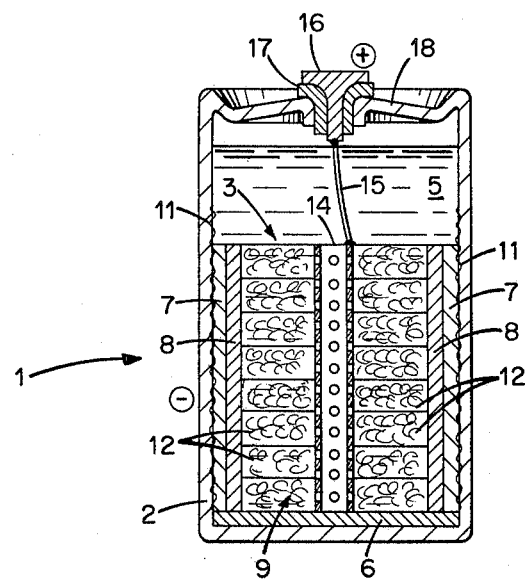
FIG. 1 is an elevational view, partly in cross section, of a primary electrochemical cell employing a carbon cathode structure in accordance with the present invention.

Referring now to FIG. 1, there is shown a primary electrochemical cell 1 in accordance with the present invention. As shown in FIG. 1, the electrochemical cell 1 generally includes an elongated metal casing or housing 2, for example, of a cylindrical configuration, within which a battery stack 3 in accordance with the invention is disposed. An electrolytic solution 5, for example, in the form of a cathodelectrolyte solution, is provided within the interior of the cell 1 to permeate various portions of the battery stack 3, in a manner to be described in detail hereinafter. A suitable and preferred form of the electrolytic solution 5 which is usable with the components of the battery stack 3 (a preferred form of which will be described in detail hereinafter), is a cathodelectrolyte solution including a reducible soluble cathode, such as thionyl chloride, and an electrolyte solute, such as lithium tetrachloroaluminate, dissolved in the thionyl chloride.

The battery stack 3 and the electrolytic solution 5 as discussed hereinabove collectively represent the electrochemical system of the cell 1. The battery stack 3 in accordance with the invention and as shown in FIG. 1 is insulated from the housing 2 of the cell 1 by a suitable insulator 6 and generally includes a concentric arrangement of an anode 7, a thin porous separator 8, and a cathode current collector electrode structure 9. The anode 7, which takes the form of a cylindrical sheet and which may be of an oxidizable active alkaline metal such as lithium, is connected mechanically and electrically to the housing 2 by means of a fine metal screen or grid 11 which is spot welded to the interior wall of the housing 2 and into which the lithium anode is physically pressed to secure the lithium anode to the screen 11. The electrical connection of the anode 7 to the housing 2 establishes the housing 2, which may be of stainless steel, as the negative terminal for the cell 1.

The aforementioned porous separator 8 is employed to electrically isolate the anode 7 from the cathode current collector electrode structure 9 and typically takes the form of a cylindrical sheet of a standard electrically-nonconductive material such as fiberglass.

The aforementioned cathode current collector electrode structure 9 in accordance with the invention generally comprises a plurality of annular, or disc-shaped, porous carbon elements 12 arranged directly above each other in a vertical stacked array, and an elongated perforated expandable metal tube 14 disposed within circular central openings of the elements 12. The tube 14 is connected by a thin metal strip 15 spotwelded thereto to a positive terminal 16 of the cell 1. The metal strip 15, for example, of nickel, is connected (e.g., spot welded) to the terminal 16 by means of a standard insulative glass or ceramic-to-metal seal 17 provided within an hermetically sealed cap 18 of the cell 1.

Figure 2:
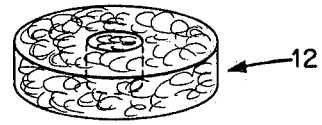
FIGS. 2 and 3 are perspective views of components employed by the carbon cathode structure in accordance with the present invention.

The plurality of porous carbon elements 12, when used with the aforementioned components and specific materials of the cell 1, act as a cathode current collector and as a catalyst where the reduction of the solvent (thionyl chloride) in the cathodelectrolyte solution takes place. Each of the elements 12, a preferred form of which is shown in FIG. 2, is produced by compressing together a plurality of discrete, semi-rigid, porous carbon conglomerates thereby to define a network of electrolyte-conducting channels throughout the element 12. The conglomerates generally contain a combination of carbon black, graphite, and a binder such as "Teflon". By virtue of the small physical size of each of the elements 12, for example, one inch in diameter and one-half inch thickness for a "D"-sized cell, a stacked array of carbon elements of any desirable length may be assembled by simply selecting the required number of elements 12 for the particular size of the cell and stacking the elements one atop the other as indicated in FIG. 1. For a "D"-sized cell, for example, eight elements 12 would be sufficient. The use of multiple carbon elements 12 in a stacked array further avoids the fragility and breakage problems associated with the aforedescribed prior art carbon structures in which the carbon structures are one-piece structures, and often of substantial length, and twisted metal current collector elements are forced or screwed into the carbon structures. Techniques for producing the conglomerates employed by the carbon elements are described in detail in the aforementioned U.S. Pat. No. 4,161,063 to which reference may be made for specific details.

Figure 3:
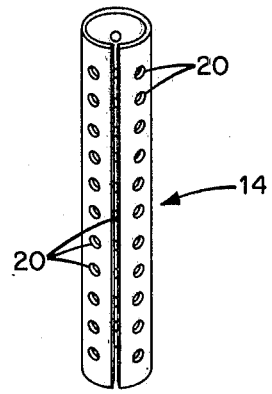

The perforated expandable metal tube 14 employed with the multiple carbon elements 12 as discussed hereinabove takes the specific form as shown in FIG. 3. As shown in FIG. 3, the perforated metal tube 14, which may be of nickel or stainless steel, is split along its entire length to define a generally C-shaped cross section and includes a large number of small openings 20 along its length. The openings 20 may be produced by simple metal stamping operations. In assembling the perforated metal tube 14 into the cell 1, the carbon elements 12 are first placed loosely around the tube 14 in its non-expanded state following which the porous separator 8 and the anode 7 (in the grid 11) are wrapped in succession around the tube/carbon element assembly. The complete assembly so formed is then placed into the housing 2 on top of the insulator 6 and the tube 14 is permanently expanded outwardly. This expansion operation is accomplished by means of a suitable tool (not shown) which is inserted into the hollow center of the tube 14 and advanced along the entire length of the tube 14 and then withdrawn. As the tube 14 expands outwardly, it establishes a close physical fit or contact with the interior wall portions of the carbon elements 12 thereby securing the array of carbon elements 12 to the tube 14. The openings 20 in the tube 14, together with the widened slit in the tube 14, serve to allow the electrolytic solution 5 (e.g., cathodelectrolyte solution) within the cell 1 to permeate and saturate the carbon elements 12, by way of the aforedescribed electrolyte conducting channels formed within the elements 12, add also to permeate the porous separator 8. In addition, the electrolytic solution causes the carbon elements 12 to expand outwardly, or swell (by up to twenty percent), thereby filling the openings 20 in the tube 14 with constituent particles thereof and establishing a permanent physical union between the tube 14 and the elements 12. The expansion of the carbon elements 12 also result in a solid, compact battery stack 3 within the cell 1. Further, by virtue of the electrolyte channels in the elements 12, the electrolytic solution is able to penetrate the carbon elements 12 and contact interior cathodic particles, thereby providing substantial active surface areas for increasing the rate capability and cell discharge capacity of the cell 1. During the discharge of the cell 1, the tube 14 electrically contacts the interior portions of the carbon elements 12 to function as a current collector.

Details relative to the method of assembly of the battery stack 3, including the assembly of the cathode current collector electrode structure 9, are disclosed and claimed in the aforementioned co-pending application Ser. No. 145,108.

While there has been described what is considered to be a preferred embodiment of the invention, it will be apparent to those skilled in the art that various changes and modifications may be made therein without departing from the invention as called for in the appended claims.

What is claimed is:

1. A carbon current collector cathode structure for use with an electrolytic solution of an electrochemical system of a primary electrochemical cell, said carbon current collector cathode structure comprising:

a plurality of individual porous carbon elements superimposed one above the other in a stacked array and each having a network of electrolyte-conducting channels formed therein for receiving an electrolytic solution by which the carbon element can be permeated by the electrolytic solution, each of said carbon elements having an opening extending completely therethrough; and an elongated, hollow, metal current collector tube having a plurality of openings formed therein along its length and positioned within and along the openings in the stacked array of carbon elements and in direct physical contact with the porous carbon elements of the stacked array, said current collector tube being adapted to receive an electrolytic solution therein and to supply said electrolytic solution to the array of stacked carbon elements by way of the openings formed therein whereby the electrolytic solution can permeate the carbon elements by way of the electrolyte-conducting channels formed in the carbon elements.

2. A carbon current collector cathode structure in accordance with claim 1 wherein:

each of the plurality of carbon elements comprises a plurality of compressed semi-rigid porous carbon conglomerates defining a network of electrolyte-conducting channels.

3. A carbon current collector cathode structure in accordance with claim 2 wherein:

the plurality of carbon elements are of like size and of annular shape and are superimposed directly on each other.

4. A carbon current collector cathode structure in accordance with claim 3 wherein:

the current collector tube further has a slit along its entire length by which electrolytic solution in the tube can be additionally supplied to the array of stacked carbon elements.

5. A primary electrochemical cell comprising: an elongated housing; and an electrochemical system contained within the housing, said electrochemical system comprising:

an electrolytic solution; and a battery stack exposed to said electrolytic solution, said battery stack comprising:

an electrode in direct contact with the housing;

a porous separator in direct contact with the electrode;

a plurality of individual porous carbon elements superimposed one above the other in a stacked array and in direct contact with the separator, each of said porous carbon elements having a network of electrolyte-conducting channels formed therein for receiving an electrolytic solution by which the carbon element can be permeated by the electrolytic solution and expand outwardly in response to said electrolytic solution, each of said carbon elements further having an opening extending completely therethrough; and an elongated, hollow, metal current collector tube having a plurality of openings formed therein along its length and positioned within and along the openings in the stacked array of carbon elements and in direct physical contact with the porous carbon elements of the stacked array, said current collector tube being adapted to receive the electrolytic solution therein and in conjunction with the electrolytic solution otherwise received by the carbon elements, to supply the electrolytic solution in the tube to the array of stacked carbon elements by way of the openings formed in the tube, whereby the electrolytic solution received by the carbon elements can permeate the carbon elements by way of the electrolyte-conducting channels formed in the carbon elements, said carbon elements responding to the electrolytic solution received thereby to expand outwardly against the porous separator and the electrode in contact with the housing and fill the openings in the current collector tube with constituent particles thereof, thereby permanently locking the array of carbon elements to the current collector tube.

6. A primary electrochemical cell in accordance with claim 5 wherein:

each of the plurality of carbon elements comprises a plurality of compressed semi-rigid porous carbon conglomerates defining a network of electrolyte-conducting channels.

7. A primary electrochemical cell in accordance with claim 6 wherein:

the plurality of carbon elements are of like size and of annular shape and are superimposed directly on each other.

8. A primary electrochemical cell in accordance with claim 7 wherein:

the current collector tube further has a slit along its entire length by which electrolytic solution in the tube can be additionally supplied to the array of stacked carbon elements.

9. A primary electrochemical cell in accordance with claim 8 wherein:

the electrode in contact with the housing and the separator are generally cylindrical in configuration and are arranged concentrically with each other and with the array of carbon elements and current collector tube.

10. A primary electrochemical cell in accordance with claim 9 wherein:

the electrode in contact with the housing is an anode structure including an oxidizable alkaline metal; and the electrolytic solution includes a reducible soluble cathode and an electrolyte solute dissolved in the soluble cathode.

11. A primary electrochemical cell in accordance with claim 10 wherein:

the oxidizable alkaline metal of the anode structure is lithium;

the reducible soluble cathode of the electrolytic solution is thionyl chloride; and the electrolyte solute of the electrolytic solution is lithium tetrachloroaluminate.

* * * * *